(12) United States Patent
Salmeen et al.

(10) Patent No.: US 7,541,743 B2
(45) Date of Patent: Jun. 2, 2009

(54) ADAPTIVE VEHICLE COMMUNICATION CONTROLLED LIGHTING SYSTEM

(75) Inventors: Irving Toivo Salmeen, Ann Arbor, MI (US); Ronald Hugh Miller, Saline, MI (US); David M. DiMeo, Windsor (CA); Gary Steven Strumolo, Beverly Hills, MI (US); Mahendra Somasara Dassanayake, Bloomfield Hills, MI (US); Sheran Anthony Alles, Livonia, MI (US); David Anthony Wagner, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/605,733

(22) Filed: Oct. 22, 2003

(65) Prior Publication Data

US 2004/0114381 A1 Jun. 17, 2004

Related U.S. Application Data

(60) Provisional application No. 60/432,973, filed on Dec. 13, 2002.

(51) Int. Cl.
*B60Q 1/14* (2006.01)
*B60Q 1/26* (2006.01)
(52) U.S. Cl. .......................... 315/77; 315/82
(58) Field of Classification Search ................. 315/77, 315/81, 82, 78, 79, 80; 362/37, 464, 324; 348/148, 143, 118
See application file for complete search history.

(56) References Cited

U.S. PATENT DOCUMENTS

| | | | | |
|---|---|---|---|---|
| 4,967,319 A | * | 10/1990 | Seko ........................... 362/466 |
| 5,446,661 A | * | 8/1995 | Gioutsos et al. ................ 701/45 |
| 5,463,384 A | * | 10/1995 | Juds ............................ 340/903 |
| 6,265,968 B1 | * | 7/2001 | Betzitza et al. .............. 340/436 |
| 6,343,869 B1 | * | 2/2002 | Kobayashi .................... 362/37 |
| 6,393,133 B1 | * | 5/2002 | Breed et al. .................. 382/100 |
| 6,403,942 B1 | * | 6/2002 | Stam .................... 250/214 AL |
| 6,429,594 B1 | * | 8/2002 | Stam et al. ..................... 315/82 |
| 6,498,570 B2 | * | 12/2002 | Ross ........................... 340/901 |
| 6,498,620 B2 | * | 12/2002 | Schofield et al. ............ 348/148 |
| 6,502,034 B1 | | 12/2002 | Miller |
| 6,553,296 B2 | * | 4/2003 | Breed et al. .................... 701/45 |
| 6,580,385 B1 | * | 6/2003 | Winner et al. .................. 342/70 |
| 6,611,610 B1 | * | 8/2003 | Stam et al. ..................... 382/104 |
| 6,820,897 B2 | * | 11/2004 | Breed et al. .................. 280/735 |
| 6,928,180 B2 | * | 8/2005 | Stam et al. ..................... 382/104 |
| 6,947,576 B2 | * | 9/2005 | Stam et al. ..................... 382/104 |
| 7,000,721 B2 | * | 2/2006 | Sugawara et al. ........... 180/169 |
| 2002/0147534 A1 | * | 10/2002 | Delcheccolo et al. ......... 701/45 |
| 2002/0156559 A1 | * | 10/2002 | Stam et al. ..................... 701/36 |
| 2002/0167589 A1 | * | 11/2002 | Schofield et al. ............ 348/148 |
| 2003/0184233 A1 | * | 10/2003 | Gourdine ...................... 315/77 |
| 2004/0075582 A1 | * | 4/2004 | Bergan et al. ............... 340/936 |
| 2004/0143380 A1 | * | 7/2004 | Stam et al. ..................... 710/36 |

* cited by examiner

*Primary Examiner*—Douglas W. Owens
*Assistant Examiner*—Minh Dieu A
(74) *Attorney, Agent, or Firm*—Frank MacKenzie

(57) ABSTRACT

A vehicle safety system (10) includes a light source (32). A beam-forming assembly (34) is optically coupled to the light source (32). An object detection sensor (16) detects an object and generates an object detection signal. A controller (18) is coupled to the beam-forming assembly (34) and the object detection sensor (16). The controller (18) adjusts illumination output of the vehicle safety system (10) in response to the object detection signal.

18 Claims, 4 Drawing Sheets

ADAPTIVE VEHICLE COMMUNICATION CONTROLLED LIGHTING SYSTEM

CROSS REFERENCE TO RELATED APPLICATIONS

The present application claims priority to U.S. Provisional Application Ser. No. 60/432,973, entitled "TRANSPONDER CONTROLLED ADAPTIVE LIGHTING FOR ENHANCED VISABILTY AND SAFETY," filed on Dec. 13, 2002, the disclosure of which is incorporated by reference herein.

BACKGROUND OF INVENTION

The present invention relates to vehicle headlight systems. More particularly, the present invention relates to an adaptive vehicle lighting system for improved visibility and roadway illumination.

It is desired by vehicle manufacturers to improve roadway illumination of a host vehicle without negatively affecting visibility of other nearby or on-coming vehicles. Improved roadway illumination can improve drivability and safety aspects associated with operation of the host vehicle, especially in low-illumination or low visibility conditions. Some low visibility conditions are, for example, driving at night, driving through a tunnel, and driving in bad weather.

Numerous vehicle headlight configurations and systems currently exist for controlling the state of headlights of a host vehicle. For example, many vehicles today include daytime running lights that are illuminated continuously not only during the daytime, but also during the nighttime, which increases noticeability of the host vehicle to other nearby vehicles.

Other vehicle headlight systems detect levels of light exterior to a host vehicle and in response thereto activate the headlights. Some vehicle headlight systems mechanically "steer" the headlights to bias the headlights toward the area where the host vehicle is being directed. The steering of the headlights may coincide with the turning of the host vehicle steering wheel. Yet other headlight control systems dim the headlights from a "high beam" mode to a "low beam" mode upon the detection of light emitted from the headlights of an oncoming vehicle or from the taillights of a leading vehicle.

There also exist electrochromatic mirrors that may be adjusted to somewhat minimize or relieve the reflections from scattering of light generated from nearby vehicle headlights. The relief is limited and the reflections can still be annoying to vehicle occupants. The electrochromatic mirrors provide limited use, but yet add additional cost to a vehicle.

All of the above-mentioned vehicle headlight systems have a common drawback of being limited to very few headlight beam illumination patterns or include numerous mechanical elements to steer or otherwise modify the headlight beam illumination pattern. Additionally, the above vehicle headlight systems are limited in their ability to maximize illumination from a host vehicle while minimizing glare to nearby vehicles.

Also, the amount of safety system features and components for implementation within a vehicle is ever increasing. Besides the safety features associated with vehicle headlight systems, other safety features are provided by collision warning and countermeasure systems. Collision warning and countermeasure systems utilize multiple transmitters, receivers, and sensors to perform tasks, such as those related to object detection and threat assessment, adaptive cruise control, and lane departure and lane-keeping control.

Thus, there exists a need for an improved vehicle safety system that provides a robust and adaptable headlight beam illumination pattern, that maximizes illumination forward of a host vehicle, and that minimizes glare and visibility interference to operators of nearby vehicles. It is also desired that the improved vehicle safety system minimize system complexity and manufacturing time and costs involved therein.

SUMMARY OF INVENTION

The present invention provides a vehicle safety system that includes a light source. A beam-forming assembly is optically coupled to the light source. An object detection sensor detects an object and generates an object detection signal. A controller is coupled to the beam-forming assembly and the object detection sensor. The controller adjusts illumination output of the vehicle safety system in response to the object detection signal.

The embodiments of the present invention provide several advantages. One such advantage that is provided by multiple embodiments of the present invention is the provision of an adaptive vehicle headlight system that maximizes illumination output and minimizes glare and visibility interference to operators of nearby vehicles.

Another advantage that is provided by an embodiment of the present invention is the provision of a vehicle safety system that shares safety system components between vehicle headlight operations and other safety system operations. In so doing, the present invention, for at least the stated embodiment, minimizes system complexity and also both manufacturing time and costs associated therewith.

Furthermore, another advantage that is provided by multiple embodiments of the present invention is versatility. The stated embodiments provide multiple techniques for detecting and communicating with an object to allow performance of various safety system tasks.

The present invention itself, together with attendant advantages, is best understood by reference to the following detailed description, when taken in conjunction with the accompanying drawing figures.

BRIEF DESCRIPTION OF DRAWINGS

For a more complete understanding of the invention, reference should be made to the embodiments illustrated in detail in the accompanying drawing figures, and also described below by way of examples of the invention.

DETAILED DESCRIPTION

Figure 1:
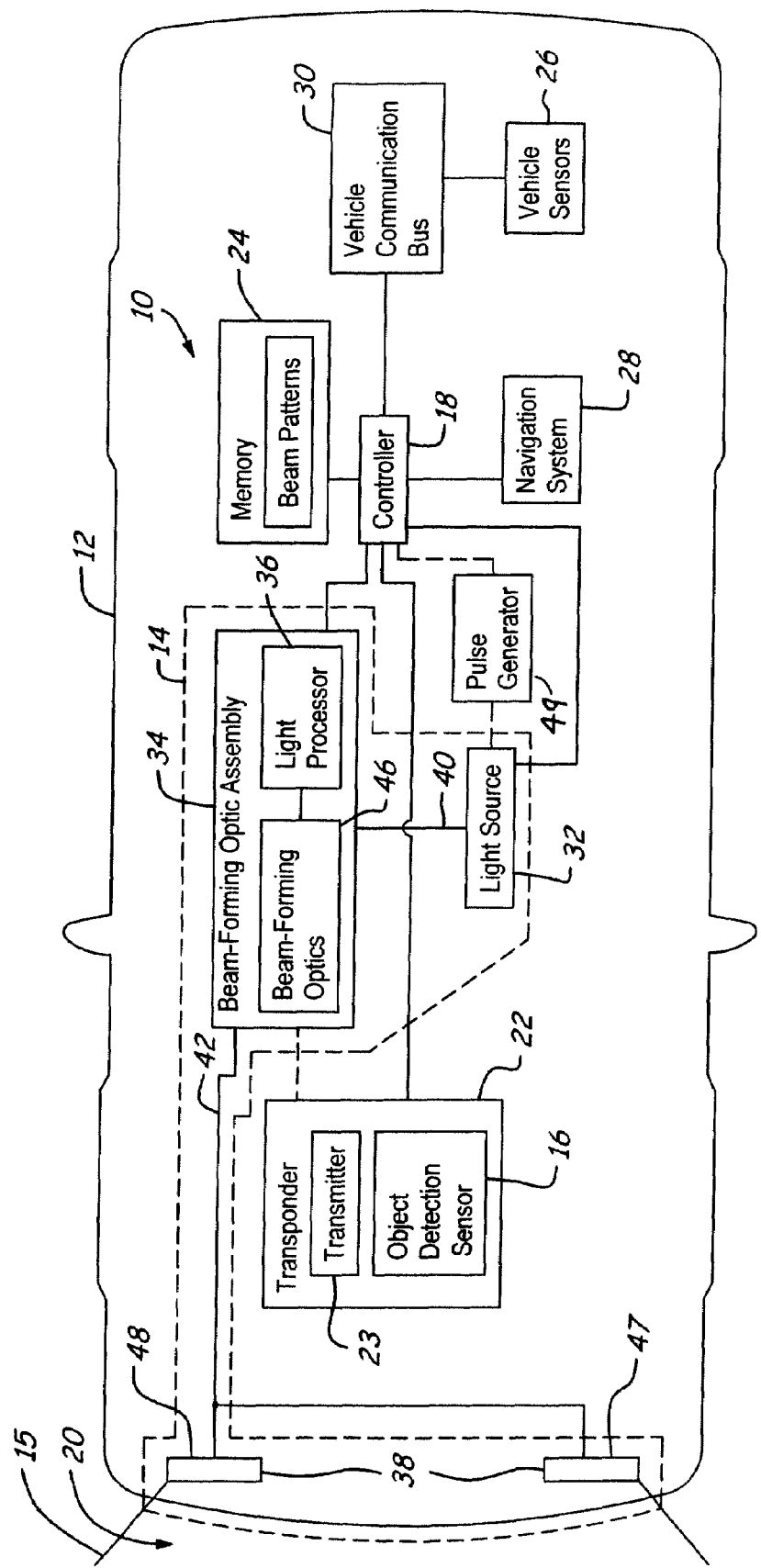
FIG. 1 is a block diagrammatic view of an adaptive vehicle communication controlled lighting system for a host vehicle in accordance with an embodiment of the present invention.

In the drawing figures discussed as follows, the same reference numerals will generally be used to refer to the same components. The present invention may be adapted and applied to various sensing systems including, for example, headlight systems, collision warning systems, collision avoidance systems, parking-aid systems, reversing-aid systems, passive countermeasure systems, adaptive cruise control systems, lane departure systems, lane-keeping systems, windshield clearing systems, or other systems known in the art.

In the following description, various operating parameters and components are described for multiple constructed embodiments. These specific parameters and components are included as examples and are not meant to be limiting.

Also, the term "object" may refer to any animate or inanimate object. An object may be a vehicle, illumination from a headlight, a light signal, a pedestrian, a lane marker, a road sign, a roadway lane designating line, a vehicle occupant, window moisture, or other object known in the art.

Referring now to FIG. 1, a block diagrammatic view of an adaptive vehicle communication controlled lighting system 10 for a host vehicle 12 in accordance with an embodiment of the present invention is shown. The adaptive system 10 performs as a vehicle headlight system and as a vehicle safety system. The adaptive system 10 controls various lighting features as well as various other safety system features, which are described in further detail below.

The adaptive system 10 includes a lighting circuit 14 that generates an illumination beam 15, an object detection sensor 16, and a controller 18. Although a specified number of object detection sensors 16 are shown, any number may be utilized. The sensor 16 detects objects in close proximity with the vehicle 12. The controller 18, in response to the detected objects, determines and adjusts the illumination output from the lighting circuit 14. The controller 18 adjusts the illumination output to prevent glare and visibility interference to vehicle operators and pedestrians while maximizing illumination within an illumination zone of interest 20.

The adaptive system 10 may also include a transponder 22 and a memory 24. The transponder 22 is used in communication with target vehicles or other objects that are capable of communication with the vehicle 12. The transponder 22 includes the sensor 16 and a transmitter 23. The transponder 22 may be of various types and styles, such as a radio frequency (RF), infrared (IR), or laser transceiver. The memory 24 is used to store multiple beam patterns. The beam patterns may be in the form of bitmaps or bitmap images. The controller 18 selects and modifies the beam patterns emitted by the lighting circuit 14 in response to the data received from the sensor 16, as well as from other vehicle and roadway data. The other vehicle and roadway data may be generated from the vehicle sensors 26 or from a navigation system 28. The controller 18 can receive the various vehicle sensory and navigation data by way of the vehicle communication bus 30. The above-described components of the adaptive system 10 are described in detail below.

The lighting circuit 14, although shown as having a single light source 32, a single beam-forming optic assembly 34 with a single light processor 36, and a pair of light emitters 38, may have any number of these devices. Also, each of these devices may be separate stand-alone devices as shown, or may be integrated into a single unit, or some combination thereof. The light source 32 is optically coupled to the beam-forming assembly 34 by way of a first optical coupling 40. The beam-forming assembly 34 is coupled to the emitters 38 by way of a second optical coupling 42. Optical couplings 40 and 42 may be in the form of fiber optic cables, multiple optic lenses or mirrors, or other optical couplings known in the art. In operation, light is generated by the light source 32, formed into a beam having a selected beam pattern by the beam-forming assembly 34, and ultimately emitted through the emitters 38 to illuminate the illumination zone 20.

The light source 32 can include any high intensity discharge light source or LED cluster which acts as a light engine. The light source 32 provides light, in a desired spectral range, to the beam-forming assembly 34. The light source 32 may include an IR light source, a near IR light source, or a laser light source. The light source 32 may be directly or indirectly coupled, via the beam-forming assembly 34, to the transmitter 23. The transmitter 23 may be utilized to perform vehicle adaptive lighting system operations, vehicle collision avoidance and countermeasure operations, and vehicle night vision operations.

The beam-forming assembly 34 is coupled to the memory 24. The beam-forming assembly 34 causes the emitters 38 to emit light in response to and in the form of a selected beam pattern. The beam pattern may be selected by the controller 18. The beam-forming assembly 34 includes the beam-forming optics 46, which are controlled by the light processor 36. The light processor 36 may be an analog or digital processor. The light processor 36 uses a beam pattern stored in the memory 24 to configure the light received from the light source 32.

The emitters 38, in the embodiment as shown, include a driver side emitter 47 and a passenger side emitter 48. The emitters 38 may include, for example, lens elements for conveying the preconditioned light into the illumination zone 20. In this way, the emitters 38 are stationary with respect to the vehicle 12 and do not include a light source or any moveable parts for the modification of a beam pattern. In the described embodiment of FIG. 1, the emitters 38 precondition light received from the beam-forming assembly 34. The emitters 38 may be in the form of headlights, taillights, indicators, infrared or laser transmitters, or may be in the form of some other illumination source known in the art.

The lighting circuit 14 may also include a pulse generator 49. The pulse generator 49 is coupled to the controller 18 and to the light source 32. The pulse generator 49 is used in communicating with a detected object via the lighting circuit 14, the transponder 22, or a combination thereof.

The object detection sensor 16 may be used to passively or actively detect an object. The sensor 16 may passively detect visible or IR light reflected, generated, or emitted from an object. The sensor 16 may also detect radar or RF waves reflected off the object. The visible and IR light may, for example, be emitted from headlights or taillights of a target vehicle.

The sensor 16 may actively detect radar or light signals from an object. For example, the sensor 16 may communicate with and receive communication signals from a target vehicle. The communication signals may be in the form of RF or light signals generated from the target vehicle. The light signals may be in the visible or IR spectrum and be generated from a target vehicle light, such as a headlight, a taillight, or a separate assigned IR, RF, or laser emitter.

The sensor 16 may be of various types and styles known in the art. The sensor 16 may be in the form of an RF, visible light, laser, or infrared transceiver or receiver, or may be in some other form known in the art. The sensor 16 may also be located anywhere on the vehicle 12. The vision sensor 16 may be a camera, a charged-coupled device, an infrared detector, a series of photodiodes, or other sensor known in the art. The controller 18 and the processor 36 may be microprocessor-based, such as a computer having a central processing unit, memory (RAM and/or ROM), and associated input and output buses. The controller 18 and the processor 36 may be application-specific integrated circuits or be formed of other logic devices known in the art. The controller 18 and the processor 36 may be portions of a central vehicle main control unit, an interactive vehicle dynamics module, a restraints control module, a main safety controller, or may be stand-alone controllers and processors as shown. The controller 18 and the processor 36 may be in direct communication with any of the above-stated components, or may communicate with each component by way of the vehicle communications bus 30, as shown with respect to the vehicle sensors 26.

The controller 18 may perform various sensing system operations including adaptive cruise control, lane-keeping control, lane-departure control, collision avoidance control, countermeasure control, or other sensing system operations known in the art. The operations may be performed sequentially or simultaneously.

Adaptive cruise control is used for monitoring objects forward of the vehicle 12 and for maintaining a safe predetermined distance away from the detected objects to prevent collision therewith. When adaptive cruise control is active, the controller 18 may warn the vehicle operator of an impending object or perform a countermeasure so as to alter the speed of travel of the vehicle 12.

Lane-keeping and lane-departure control refer to when the controller 18 monitors lane markings or roadway lane designating lines and warns the vehicle operator when the vehicle 12 exits a current lane of travel or is directed to exit the current lane of travel. The controller 18 may perform a countermeasure to maintain the current lane of travel, such as controlling vehicle steering to adjust direction of travel of the vehicle 12.

Countermeasure control may include occupant related operations, such as detecting occupant characteristics, determining a countermeasure to perform, and adjusting times and activating rates of the countermeasure. The occupant characteristics may include occupant positioning within a seat, occupant size, or other known occupant characteristics.

The controller 18 and the processor 36 may perform tasks related to the above-stated safety system operations and controls sharing the lighting circuit 14 and the transponder 22.

The transponder 22 may include the sensor 16 and the emitter or transmitter 23. The transponder 22 may transmit and receive RF signals, visible light signals, IR signals, laser signals, or other signals known in the art. The transponder 22 may be used to detect and communicate with nearby objects. The communication signals may be used to identify and determine various relative vehicle information, such as range, range rate, and direction of travel, as well as other information known in the art.

The memory 24 may be of various types and styles as known in the art. The memory 24 may be a portion of the controller 18 or of the processor 36. In one embodiment of the present invention, the memory 24 stores multiple bitmap beam patterns for selection by the controller 18 and for use by the processor 36 in generation of a desired beam pattern within the illumination zone 20.

The bitmap beam patterns are used to define the desired light patterns on the roadway. The bitmap beam patterns may be stored in the form of a look-up table. The bitmap beam patterns can define, for example, high-beam and low-beam patterns for each emitter 38, as well as left turn and right turn light patterns. Vehicle speed indexed beam patterns are also contemplated wherein the illumination would be increased in distance as the vehicle speed increases. Numerous beam patterns can thus be digitally formed by the beam-forming assembly 34 in response to vehicle and roadway conditions. The beam patterns can be formed without the need for multiple lenses, bulbs, or other mechanical devices that may be used to modify a beam pattern.

The vehicle sensors 26 may include a steering wheel angle sensor, a brake sensor, a throttle sensor, a road temperature sensor, a traction control sensor, a wheel speed sensor, a light sensor, a turn signal sensor, a windshield wiper sensor, a transmission gear or speed sensor, or other vehicle sensor known in the art. Vehicle information generated by the sensors 26 may include information related to the vehicle type, speed, heading, location, yaw, pitch, roll, or other information associated with the stated sensors, as well as other information known in the art.

The navigational system 28 may include global positioning system (GPS) data, differential GPS data, or carrier phase differential GPS data, as well as navigational roadway data. The navigational system 28 provides navigational data to the controller 18 for the selection of the appropriate beam pattern. The navigational data may include digital navigational map data. The navigational map data can be used to provide road segment classification and intersection determination data including elevation changes in the road surface, which can further be used in selecting or modifying a beam pattern. In addition, when the GPS information is not available or is sporadic due to buildings or atmospheric effects, an inertial guidance system can be used to provide sub-second geospatial reckoning to the controller 18 with knowledge of the vehicle location and heading information.

The bus 30 may also be of various types and styles. The bus 30 may be in the form of a car area network bus, a series control panel bus, a universal asynchronous receiver/transmitter based protocol bus, or other bus known in the art. Although the bus 30 is shown in FIG. 1 as merely providing communication between the controller 18 and the vehicle sensors 26, it may also provide communication between any of the above-mentioned components.

Referring now to FIGS. 2-5, the drawing therein show various beam illumination patterns emitted by the host vehicle 12 when utilizing the adaptive system 10 to thereby adjust a beam pattern in response to one or more target vehicles in proximity with the host vehicle 12, in accordance with multiple embodiments of the present invention.

Figure 2:
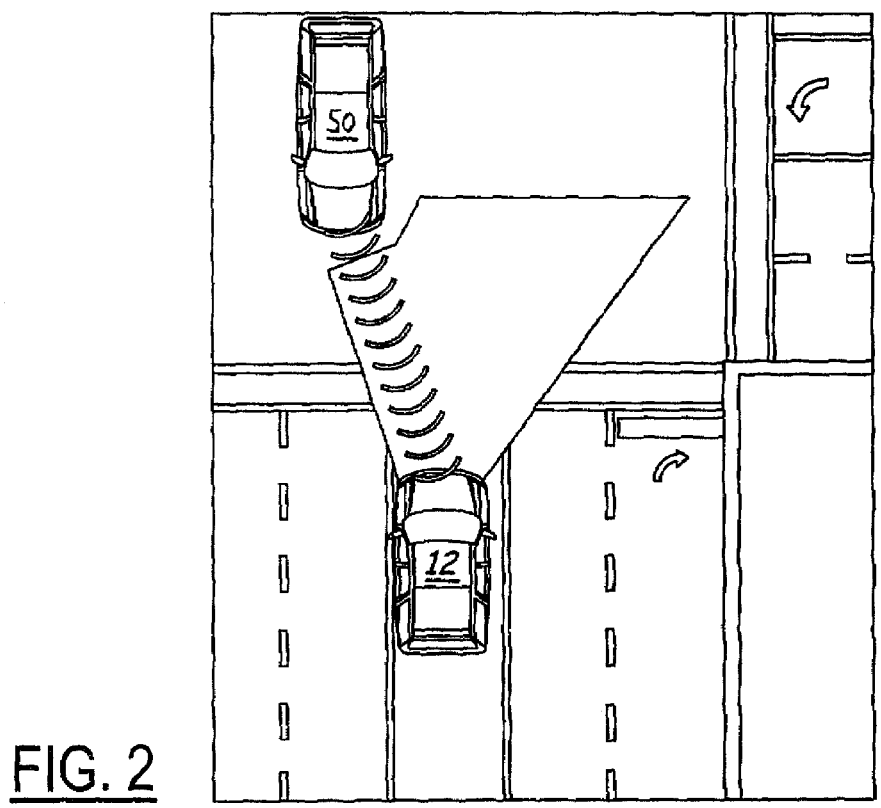
FIG. 2 shows a sample beam illumination pattern for the host vehicle that has been adjusted in response to a forward on-coming target vehicle in accordance with an embodiment of the present invention.

FIG. 2 is an illustrative example of when the host vehicle 12 is being approached by a forward on-coming target vehicle 50. The controller 18 and the processor 36, in response to detection of or communication with the target vehicle 50, select a beam pattern and adjust emission of that beam pattern so as to not emit light, or at least minimize the emission of such light, in the direction of the target vehicle 50. By minimizing light emission in the direction of the target vehicle 50, the controller 18 and the processor 36 minimize light scattering from side and rear view mirrors. The controller 18 and/or processor 36 signals the driver side emitter 47 to emit light at a downward angle. Thus, the emitters 38 may be positioned at different angles depending upon detection of an object and the relative location of that object.

Figure 3:
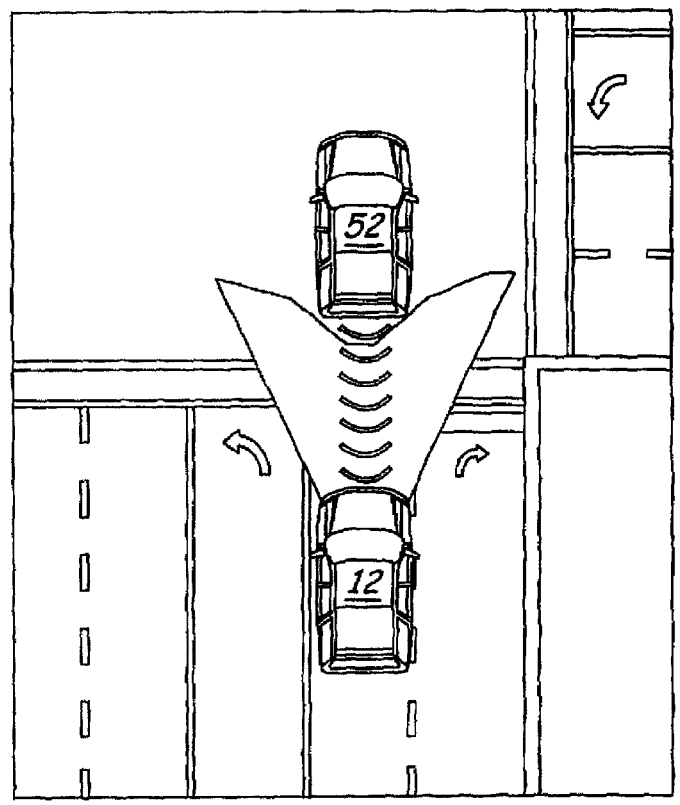
FIG. 3 shows another sample beam illumination pattern for the host vehicle that has been adjusted in response to a followed target vehicle in accordance with an embodiment of the present invention.

FIG. 3 is an illustrative example of when the host vehicle 12 is following a target vehicle 52. The light emitted from each of the emitters 38 is altered, such that they are not directed at the target vehicle 52.

Figure 4:
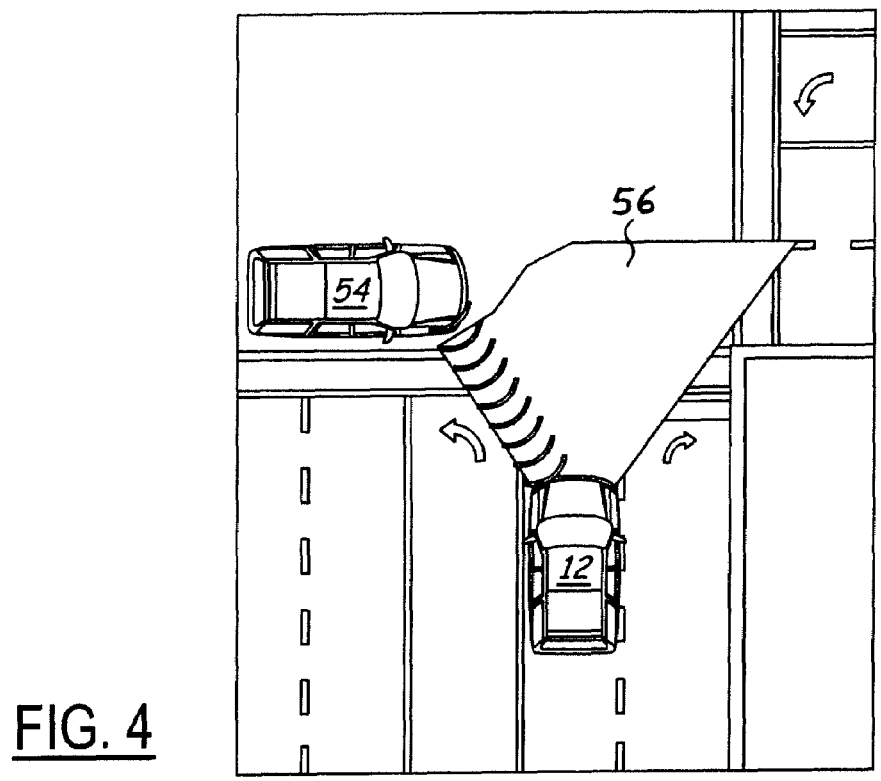
FIG. 4 shows another sample beam illumination pattern for the host vehicle that has been adjusted in response to a lateral on-coming target vehicle in accordance with an embodiment of the present invention.

FIG. 4 is an illustrative example of when the host vehicle 12 is being approached by a lateral on-coming target vehicle 54. The beam pattern 56 is adjusted as the target vehicle 54 passes in front of the host vehicle 12. For example, the driver side emitter 47 may be initially angled downward and gradually angled upward as the target vehicle 54 passes. The passenger side emitter 48 may be angled upward, gradually angled downward, and back upward as the target vehicle 54 passes.

Figure 5:
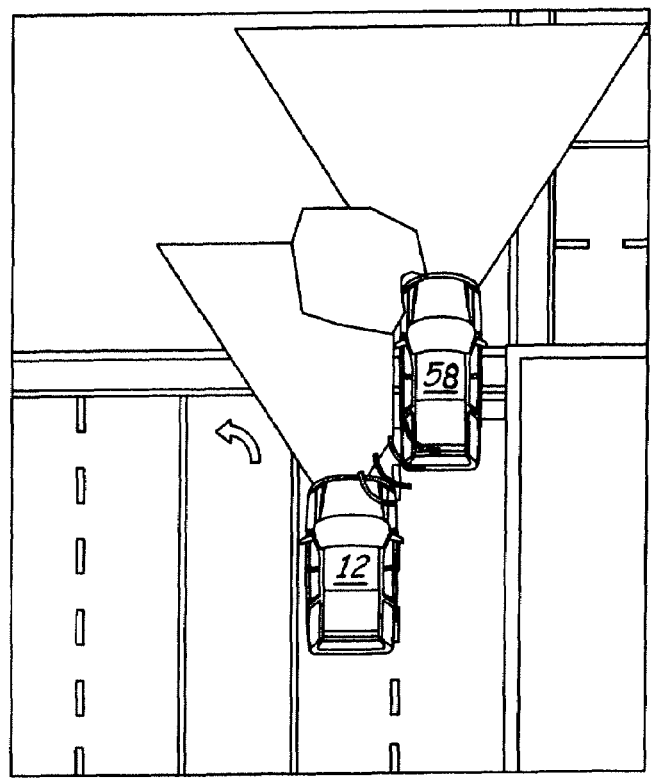
FIG. 5 shows another sample beam illumination pattern for the host vehicle that has been adjusted in response to a laterally located target vehicle in accordance with an embodiment of the present invention.

FIG. 5 is an illustrative example of when the host vehicle 12 detects a target vehicle 58 that is laterally located relative to the host vehicle 12 and traveling in approximately the same direction. The beam pattern generated by host vehicle 12 may be modified to prevent the illumination of the target vehicle 58 and to not interfere with the beam pattern generated by the target vehicle 58.

The above-stated beam pattern adjustments are for example purposes only. The beam patterns may be adjusted in angle, focus, amplitude, position, and shape.

Figure 6:
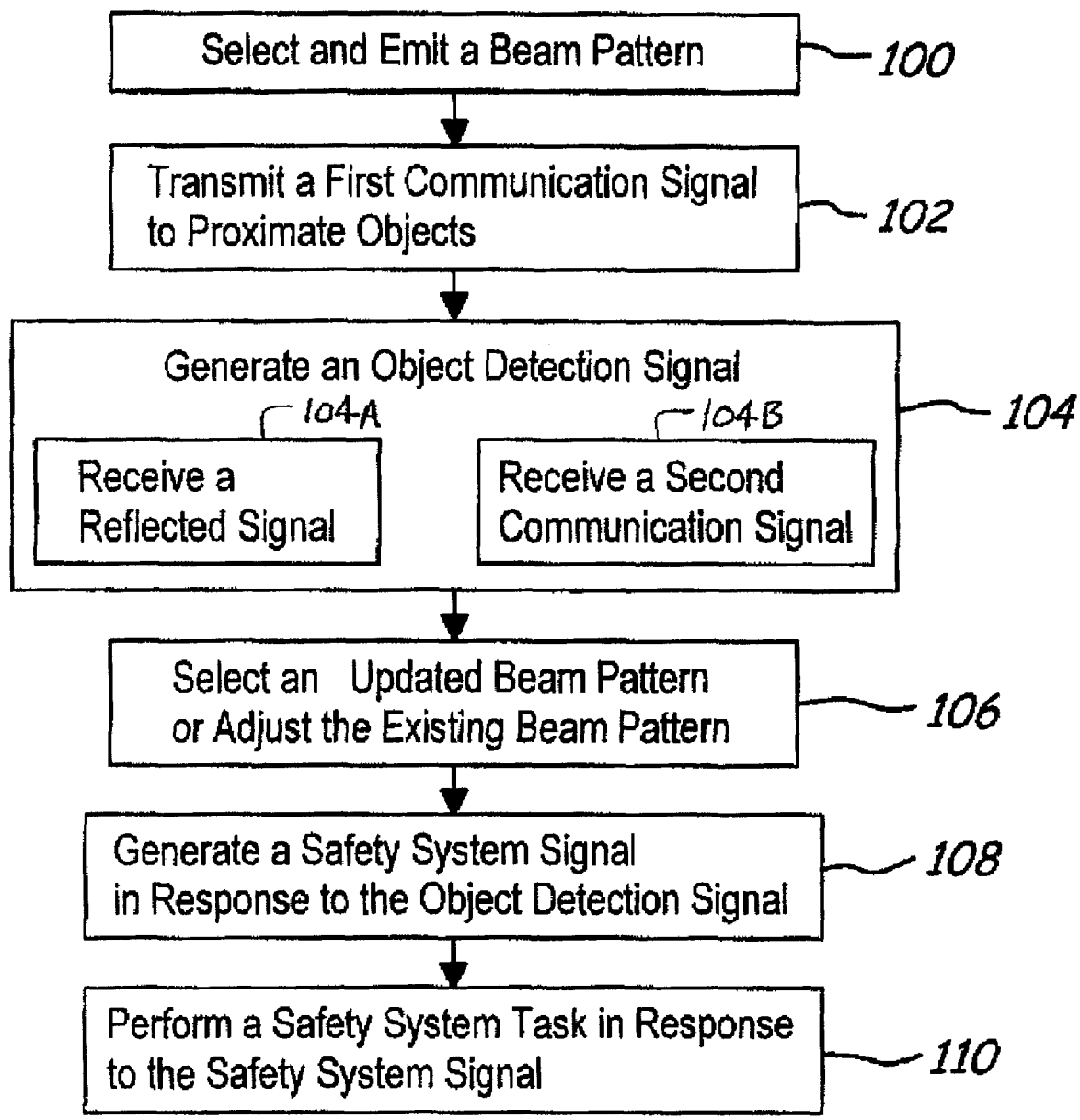
FIG. 6 is a logic flow diagram illustrating a method of operating the adaptive system of FIG. 1 in accordance with an embodiment of the present invention.

Referring now to FIG. 6, a logic flow diagram illustrating a method of operating the adaptive system 10 in accordance with an embodiment of the present invention is shown.

In step 100, a beam pattern is selected and emitted from the emitters 38. The controller 18 selects a beam pattern, which is processed and formed by the beam-forming assembly 34 and then emitted by the emitter 38 to illuminate the illumination zone 20. The beam pattern is emitted to improve roadway illumination and enhance vehicle safety. The beam pattern may be selected in response to vehicle or navigation data generated from the vehicle sensors 26 and the navigation system 28.

In step 102, the system 10 may transmit a first communication signal to objects that are proximate to the vehicle 12. The system 10 may transmit the communication signal via the lighting system 14, the transponder 22, or a combination thereof.

In step 104, the sensor 16 detects an object, such as a target vehicle. The sensor 16 generates an object detection signal in response to the detection of the object. In step 104A, the sensor 16 may receive a reflected signal generated from the reflection of the first communication signal on the object. In step 104B, the sensor 16 may receive a second communication signal generated from the object. The second communication signal may be in the form of a light or RF signal and may or may not be in response to the first communication signal.

In step 106, the controller 18, in response to the object detection signal, may select an updated beam pattern or adjust the existing beam pattern. The object detection signal may include various object related information. The updated beam pattern may also be selected in response to vehicle or navigation data generated from the vehicle sensors 26 and the navigation system 28.

In step 108, the controller 18 may generate multiple safety system signals in response to the object detection signals. The safety system signals may include not only beam pattern information but also other information related to adaptive cruise control, lane-departure or lane-keeping control, and countermeasure control.

In step 110, the controller 18 in response to the safety system signal may perform various tasks related to the above-mentioned safety system controls and operations. For example, the controller 18 may adjust traveling speed of the vehicle 12, as part of an adaptive cruise control operation, to prevent colliding with the detected object.

The above-described steps are meant to be illustrative examples and may be easily modified depending upon an intended application. furthermore, the steps may be performed sequentially, synchronously, simultaneously, or in a different order depending upon the application.

The present invention provides an adaptive vehicle communication controlled lighting system that allows for multiple beam patterns to be selected from in response to communication between a host vehicle and an object. The present invention also allows transmitters and receivers to be shared between a vehicle lighting system and other vehicle safety systems, thereby minimizing vehicle components and system complexity. The present invention further provides a symmetric and continuous lighting pattern, as well as a programmable lighting pattern that can vary dynamically in response to environmental conditions experienced by a host vehicle.

While the invention has been described in association with one or more embodiments, it is to be understood that the specific mechanisms and techniques which have been described herein are merely illustrative of the principles of the invention, and numerous modifications may be made to the methods and apparatus described herein without departing from the spirit and scope of the invention as defined by the appended claims.

The invention claimed is:

1. A vehicle safety system comprising:
   at least one light source;
   at least one beam-forming assembly optically coupled to said at least one light source;
   at least one emitter optically coupled to said at least one beam-forming assembly;
   at least one object detection sensor operable to detect at least one object and generate at least one object detection signal;
   a controller coupled to said at least one beam-forming assembly and said at least one object detection sensor; and
   a memory coupled to said controller and operable to store a plurality of selectable beam patterns;
   wherein said controller is operable to select at least one beam pattern from said selectable beam patterns stored in said memory and accordingly control at least one said beam-forming assembly so as to configure light received from at least one said light source for emission via at least one said emitter to thereby produce at least one beam illumination pattern for enhancing visibility of a roadway;
   wherein said controller is operable to select at least one other beam pattern from said selectable beam patterns in response to at least one said object detection signal so as to change at least one said beam illumination pattern emitted from at least one said emitter; and
   wherein said controller is operable to change at least one said beam illumination pattern emitted from at least one said emitter in response to at least one said object detection signal by adjusting at least one beam illumination parameter selected from the group consisting of beam amplitude, beam location, beam focus, beam angle, and beam shape.

2. A vehicle safety system as in claim 1, wherein at least one said object detection sensor is a receiver and is operable to receive a communication signal from at least one said object, and said controller is operable to adjust at least one said beam illumination pattern in response to said communication signal.

3. A vehicle safety system as in claim 1, wherein at least one said object detection sensor is a passive object detection sensor.

4. A vehicle safety system as in claim 1, wherein at least one said object detection sensor is selected from the group consisting of a radio frequency transceiver, a radio frequency receiver, a radio frequency sensor, an infrared transceiver, an infrared receiver, an infrared sensor, a laser transceiver, and a laser sensor.

5. A vehicle safety system as in claim 1, wherein said vehicle safety system further comprises a transmitter coupled to said controller and operable to transmit a first communication signal, and at least one said object detection sensor is operable to receive a second communication signal in response to said first communication signal and adjust at least one said beam illumination pattern in response to said second communication signal.

6. A vehicle safety system as in claim 1, wherein said controller is operable to adjust at least one said beam illumination pattern in response to at least one vehicle operating condition.

7. A vehicle safety system as in claim 6, wherein at least one said vehicle operating condition is selected from the group consisting of velocity, speed, directional heading, acceleration, location, steering wheel angle, brake status, throttle angle, turn signal status, traction control status, differential wheel speed, light status, turn indicator status, windshield wiper status, windshield wiper speed, and engine speed.

8. A vehicle safety system as in claim 6, wherein said vehicle safety system further comprises a navigation system coupled to said controller, and said controller is operable to receive information related to at least a portion of said at least one vehicle operating condition from said navigation system.

9. A vehicle safety system as in claim 1, wherein said controller is operable to adjust a vehicle state in response to at least one said object detection signal.

10. A vehicle safety system as in claim 9, wherein said controller, for adjusting said vehicle state, is operable to adjust at least one vehicle operating condition selected from the group consisting of velocity, speed, directional heading, acceleration, location, steering wheel angle, brake status, throttle angle, turn signal status, traction control status, differential wheel speed, light status, turn indicator status, windshield wiper status, windshield wiper speed, and engine speed.

11. A vehicle safety system as in claim 9, wherein at least one said object detection sensor is operable to receive a cruise control signal, and said controller in response to said cruise control signal is operable to adjust said vehicle state.

12. A vehicle safety system as in claim 1, wherein said controller is operable to adjust a cruise control parameter in response to at least one said object detection signal.

13. A vehicle safety system as in claim 1, wherein said controller is operable to independently adjust each said beam illumination pattern that is emitted by each said emitter.

14. A vehicle safety system as in claim 1, wherein at least one said object detection signal is generated in response to illumination generated by and received from at least one said object.

15. A vehicle safety system as in claim 1, wherein at least one said object detection signal is generated in response to at least one communicative light signal generated by and received from at least one said object.

16. A vehicle safety system as in claim 1, wherein at least one said emitter is operable to emit a communicative light signal, and at least one said object detection sensor is operable to generate at least one said object detection signal in response to said communicative light signal.

17. A headlight system for a vehicle, said headlight system comprising:
　at least one light source;
　at least one beam-forming assembly optically coupled to said at least one light source;
　at least one emitter optically coupled to said at least one beam-forming assembly;
　a transmitter operable to generate a first communication signal;
　a receiver operable to receive a second communication signal that is generated by an object external to said vehicle and in response to said first communication signal; and
　a controller coupled to said at least one beam-forming assembly, said transmitter, and said receiver;
　wherein said controller is operable to control at least one said beam-forming assembly so as to configure light received from at least one said light source for emission via at least one said emitter to thereby produce at least one beam illumination pattern for enhancing visibility of a roadway;
　wherein each said beam illumination pattern has associated beam illumination parameters including beam angle, beam focus, beam amplitude, beam position, and beam shape; and
　wherein said controller is operable to change at least one said beam illumination pattern in response to said second communication signal by adjusting at least one of said beam illumination parameters.

18. A method of operating a headlight system on a vehicle for adaptively illuminating a roadway to enhance visibility, said method comprising the steps of:
　controlling said headlight system to selectively produce a beam illumination pattern that illuminates said roadway;
　detecting at least one communication signal generated from at least one object that is external to said vehicle;
　controlling said headlight system, in response to and in accordance with each said communication signal, to selectively produce an alternative beam illumination pattern that illuminates said roadway; and
　controlling said headlight system, in response to and in accordance with each said communication signal, to selectively alter its beam illumination pattern by adjusting at least one beam illumination parameter selected from the group consisting of beam angle, beam focus, beam amplitude, beam position, and beam shape.

* * * * *